United States Patent

[11] 3,586,236

| [72] | Inventor | George Schaffler<br>Augsburg, Germany |
|---|---|---|
| [21] | Appl. No. | 829,535 |
| [22] | Filed | June 2, 1969 |
| [45] | Patented | June 22, 1971 |
| [73] | Assignee | Keller & Knappich GmbH<br>Augsburg, Germany |
| [32] | Priority | Nov. 2, 1968 |
| [33] | | Germany |
| [31] | | P 18 06 595.7 |

[54] WATER CANNON VEHICLE
11 Claims, 4 Drawing Figs.

[52] U.S. Cl. ............................................... 239/172,
89/36, 169/2
[51] Int. Cl. ............................................... B05b 17/00
[50] Field of Search............................................ 239/172;
169/1, 2, 24, 25; 296/1, 23, 24, 28, 84; 89/36

[56] References Cited
UNITED STATES PATENTS

| 1,798,524 | 3/1931 | Palma | 296/84 |
| 2,360,397 | 10/1944 | Carpenter | 169/24 |
| 2,698,664 | 1/1955 | Freeman | 239/264 X |

OTHER REFERENCES

Advertisement— " Patrol Car, Convoy Escort..." taken from ORDNANCE MAGAZINE Sept.— Oct. 1968 Vol. LIII No. 290, Backcover Company is Bauer Ordnance Co.

*Primary Examiner*—Lloyd L. King
*Assistant Examiner*—John J. Love
*Attorney*—Allison C. Collard ABSTRACT: A motor-driven water cannon vehicle having a cabin with a roof which includes swivel mountings for supporting a plurality of water nozzles. The cabin includes a windshield with a protective screen or grating mounted over it. Water nozzles are also provided on the sides of the vehicle to protect blind spots. The windshield also includes wipers and solvent wash sprays to clear away paint or chemicals used against the vehicle.

PATENTED JUN22 1971 3,586,236

INVENTOR.
GEORG SCHÄFFLER
BY
ATTORNEY

WATER CANNON VEHICLE

This invention relates to a motor-driven water cannon vehicle with pivotable water jets arranged on the sides and roof for use in operations against rioters and street mobs.

More specifically, this invention relates to a motor-driven water cannon vehicle which can be used against rioters and street mobs, and which can defensively sustain itself against attack from chemicals and flying objects.

The present invention provides a vehicle which can maintain itself in a constant state of readiness, by preventing obstruction of its vision by bombardment with containers of oil paints, or burning liquids. The vehicle is also resistant to close range attacks by particularly rough rioters. The only weapon used by the vehicle consists of powerful jets of water, which do not cause serious bodily injuries. These jets necessitate screening measures against weapons, the mostly likely ones being listed herein.

In accordance with the invention, the water cannon vehicle includes a protective grating of meshlike structure located at a considerable distance in front of its windshield. This grating causes paint containers, hurled against the vehicle, to be smashed as some distance in front of the windshield. The paint splashes which reach the windshield can be easily washed off by the use of cleaning fluids. The invention thus also provides a windshield washing installation which disperses a solvent for cleaning the windshield even when it is contaminated by oil paints or the like. The invention further provides a high pressure rinsing device, using water, to clean the windshield and to extinguish burning liquids. The protective grating over the windshield is preferably adapted to be hinged open and closed from within the driving cab, so as to allow an unobstructed view when the vehicle is driven to the site of operation.

In a further aspect of the invention, protective screens or gratings of meshlike structure are also arranged with clearance from the side windows. This allows the windows to be cleaned, at least partially, on their outside surfaces during operation without climbing out or removing the gratings.

Despite the fact that the jets can pivot in all directions on the roof, there are still blind spots around the sides of the vehicle which cannot be covered adequately. These blind spots, especially at the longitudinal sides, are open to close range attacks. In order to protect against these types of attacks, power water jets are arranged on the longitudinal sides or corners of the vehicle. These water jets are pivotal through 180°, or 270° at the corners in a horizontal plane. In their inoperative positions, they can be located in recesses on the sides of the vehicle to prevent them being boarded by rioters.

Some of the water jet nozzles may be provided with control columns projecting partly into the driving cab. These type of jets leave leg room, and allow freedom of movement for their operation, which has to be performed while standing, such as for the rear roof water cannon. The rear window also has a protective grating of meshlike structure arranged in front thereof, with a considerable spacing between the window and the grating.

It is therefore an object according to the present invention to provide a motor-driven water cannon vehicle which includes a plurality of pivotably mounted water jets capable of being directed against rioters.

It is another object of the present invention to provide a motor-driven water cannon vehicle which is capable of withstanding attack rioters.

It is still another object of the present invention to provide a motor-driven water cannon vehicle which is simple in design, easy to manufacture, and reliable in operation.

Other objects and features of the present invention will become apparent from the following detailed description considered connection with the accompanying drawing, which discloses one embodiment of the present invention. It is to be understood, however, that the drawing is designed for the purpose of illustration only, and not as a definition of the limits of the invention.

In the drawing, wherein similar reference characters denote similar elements throughout the several views.

Figure 1:
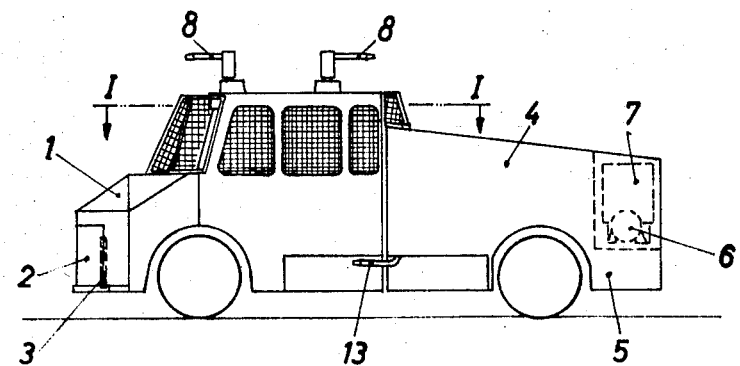
FIG. 1 is a longitudinal side view of the vehicle
Figure 2:
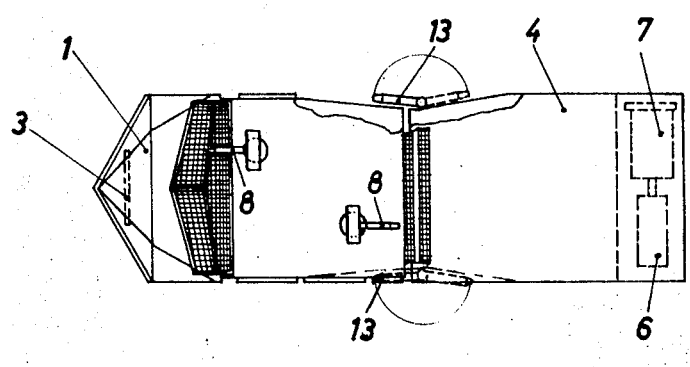
FIG. 2 is a plan view.
Figure 3:
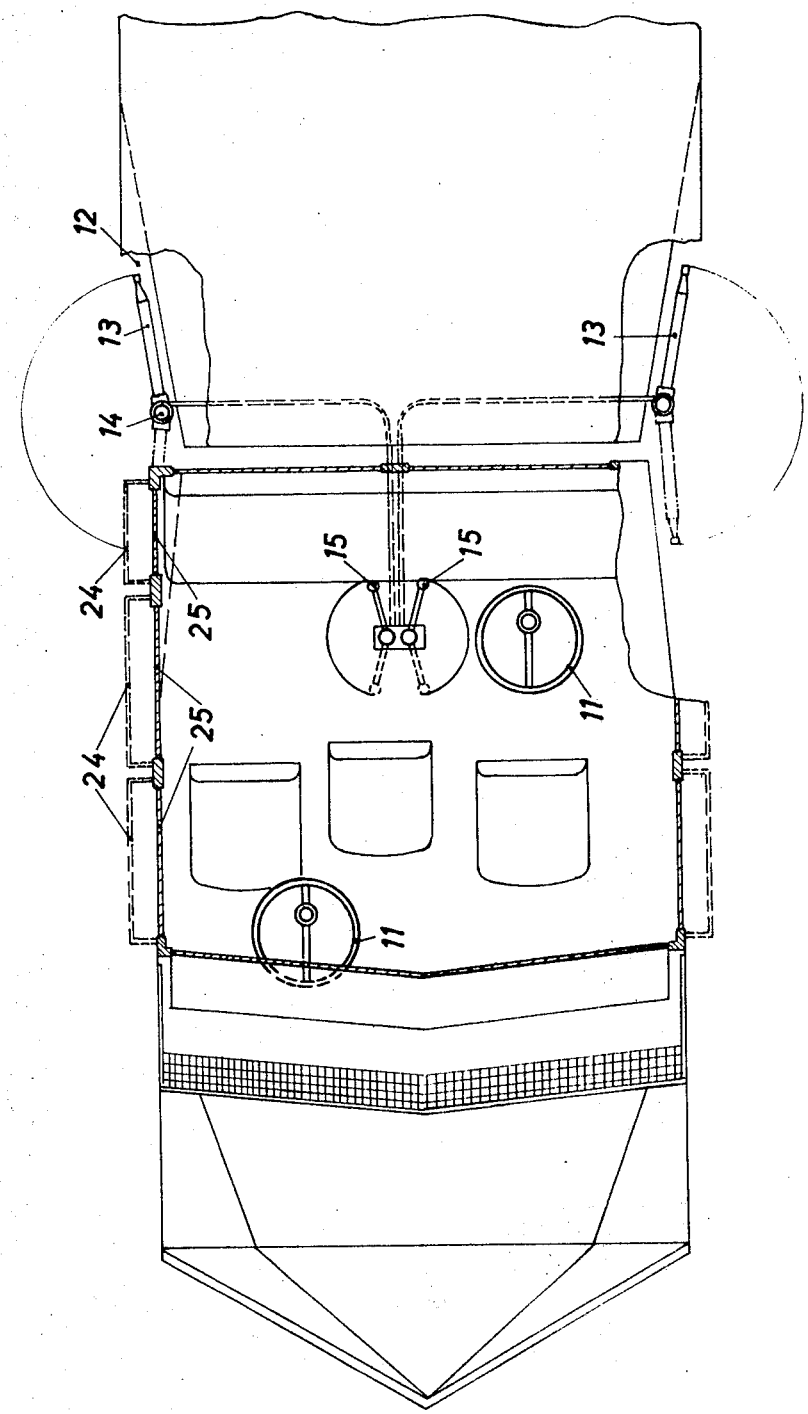
FIG. 3 is an enlarged, detail plan view taken along the section I–I of FIG. 1; and, FIG. 4 is a fragmentary sectional longitudinal side view of the cab.
Figure 4:
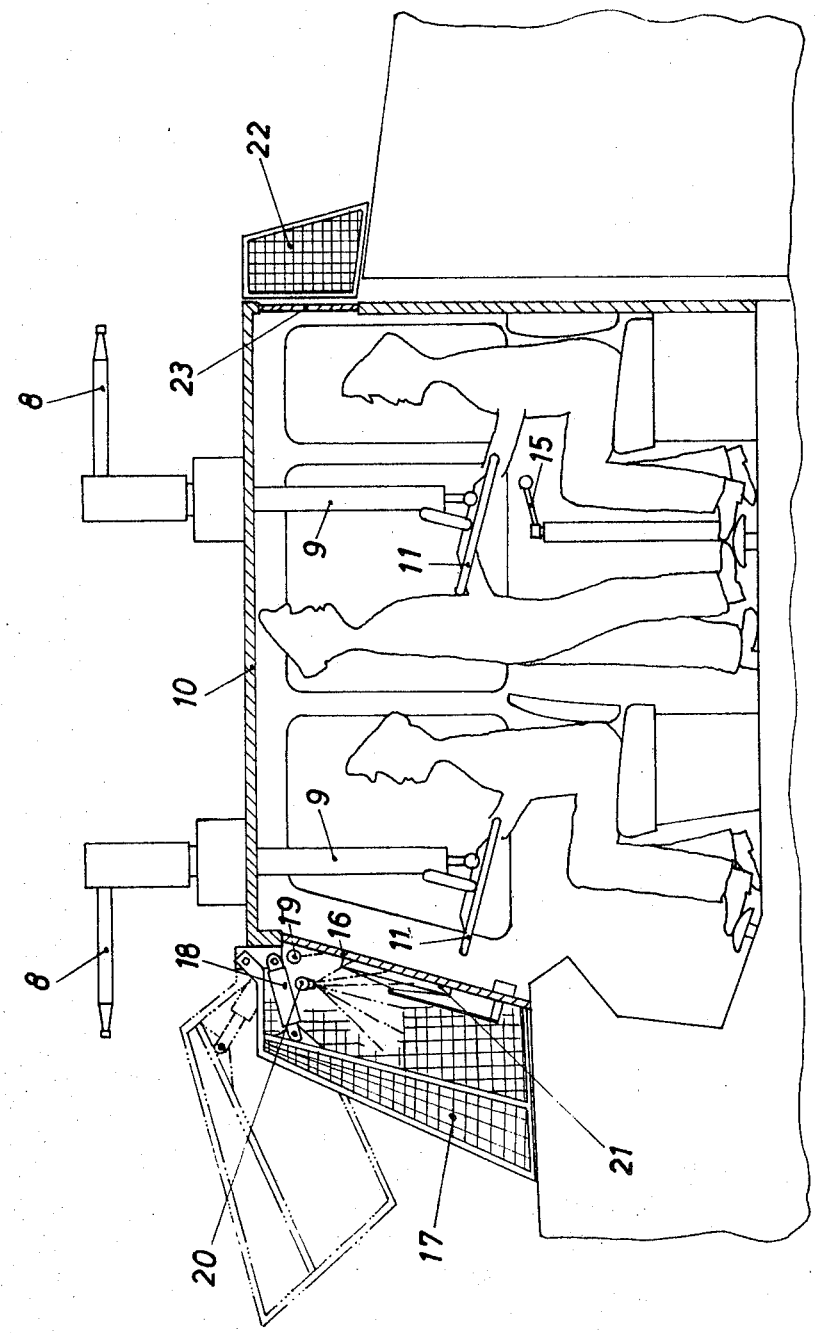

Referring to FIGS. 1—4, the vehicle motor which is mounted in front, is protected by an armored hood 1 which is wedge-shaped to clear obstructions. A front portion 2, of armored hood 1 is retained by quick-release fasteners which can be opened only with a key so as to provide access to a standard snowplow attachment plate 3 located behind it, thus allowing the vehicle to be used for clearing snow. The wedge-shaped armored hood 1 enables obstructions erected by rioters to be easily removed At the rear, behind the water reservoir 4, there is an armored space 5 for a water pump 6 and motor 7. Projecting from the roof of the cab, at the front and rear, are water nozzles 8 which are adapted to be vertically pivoted about a horizontal plane, and rotatable about a perpendicular axis, for which purpose their control columns 9 project from above, partly into cab 10. Control wheels 11 connected to columns 9 are ready at hand for manipulation of jets 8 when either seated or standing. There are also water jet nozzles 13 which are adapted to be pivoted 180° in operation about perpendicular axes 14 in horizontal plane, allowing the blind spots of the roof jets 8 to be swept at a lower elevation. Jet nozzles 13 are operated by means of hand levers 15, and can be located, when not in use, in recesses 12 within the profile of the vehicle.

In front of forward windshield 16, and displaced a small distance therefrom, is mounted a protective screen or grating 17 of meshlike construction. Grating 17 can be raised vertically by means of fluid pressure applied to hydraulic cylinders 18, as shown in dotted line in FIG. 4. Nozzles 19 disposed above the windshield, spray solvents for oil removal and the like. High pressured water nozzles 20 are also provided for washing windshield 16, with assistance from windshield wipers 21. The rear window 23 is also provided with a protective grating 22. The side windows 25 are covered over, a short distance therefrom, with protective gratings 24.

While only a single embodiment of the present invention has been shown and described, it will be understood that many changes and modifications may be made thereunto without departing from the spirit and scope of the invention.

What I claim is:

1. A motor-driven water cannon vehicle comprising;
   a cabin,
   a roof disposed over said cabin,
   a plurality of pivotable mountings disposed on said roof,
   at least one water nozzle connected to each of said mountings,
   a windshield mounted in said cabin,
   a protective grating of meshlike construction mounted spaced-apart from and in front of said windshield on said cabin,
   windshield washing means,
   a solvent for dispersal from said washing means for washing said windshield when contaminated with oil base paint, and
   high pressure water rinsing means for washing said windshield and for extinguishing burning liquids.

2. A motor-driven water cannon vehicle comprising;
   a cabin,
   a roof disposed over said cabin,
   a plurality of pivotable mountings disposed on said roof,
   at least one water nozzle connected to each of said mountings,
   a windshield mounted in said cabin,
   a protective grating of meshlike construction mounted spaced apart from and in front of said windshield on said cabin, and water nozzle pivotable mountings disposed on the longitudinal sides of the vehicle for sweeping the blind spots of said roof nozzles, said pivotable mountings disposed on the longitudinal side being retractable into recesses defined by the vehicle.

3. The water cannon vehicle as recited in claim 2 additionally comprising further gratings spaced from the rear said columns side windows of said cabin, said gratings being of meshlike structure.

4. The water cannon vehicle as recited in claim 2 comprising control columns for said roof nozzles, said columns projecting through said roof partially into said cabin.

5. The water cannon vehicle as recited in claim 2 comprising wedge-shaped armored hood on the front of the vehicle for clearing obstacles.

6. The water cannon vehicle as recited in claim 5, wherein said hood defines an opening, a snowplow attachment plate mounted behind said opening, and a lockable front section for securing said opening to said vehicle.

7. The water cannon vehicle as recited in claim 4, comprising means operable from said cabin for moving said protective grating vertically upward and downward.

8. The water cannon vehicle as recited in claim 1 additionally comprising further gratings spaced from rear and side windows of said cabin, said gratings being of meshlike structure.

9. The water cannon vehicle as recited in claim 1, comprising control columns for said roof nozzles, said columns projecting through said roof partially into said cabin.

10. The water cannon vehicle as recited in claim 1, comprising wedge-shaped armored hood on the front of the vehicle for clearing obstacles.

11. The water cannon vehicle as recited in claim 10, wherein said hood defines an opening, a snowplow attachment plate mounted behind said opening, and a lockable front section for securing said opening to said vehicle.